United States Patent [19]

Verduijn

[11] Patent Number: 5,756,064

[45] Date of Patent: May 26, 1998

[54] SILICEOUS OFFRETITE

[75] Inventor: Johannes Petrus Verduijn, Leefdaal, Belgium

[73] Assignee: Exxon Chemical Patents Inc., Wilmington, Del.

[21] Appl. No.: 459,893

[22] PCT Filed: Feb. 19, 1992

[86] PCT No.: PCT/EP92/00370

§ 371 Date: Sep. 30, 1993

§ 102(e) Date: Sep. 30, 1993

[87] PCT Pub. No.: WO92/14680

PCT Pub. Date: Sep. 3, 1992

Related U.S. Application Data

[63] Continuation of Ser. No. 108,554, Sep. 30, 1993, abandoned.

[30] Foreign Application Priority Data

Feb. 21, 1991 [GB] United Kingdom ............... 9103664

[51] Int. Cl.[6] ............................................. C01B 39/30
[52] U.S. Cl. .................. 423/705; 423/716; 423/DIG. 38; 502/73; 502/74; 502/77
[58] Field of Search .................... 423/702, 704, 423/705, DIG. 38; 502/64, 66, 77

[56] References Cited

U.S. PATENT DOCUMENTS 3,578,398  5/1971  Elmer ..................... 423/DIG. 38 X
4,259,174  3/1981  Chen ............................. 208/111
4,521,297  6/1985  Anqevine et al. ............ 423/DIG. 38 X
4,687,653  8/1987  Arika et al. ..................... 423/700
4,834,961  5/1989  Fajula ........................... 502/60 X

FOREIGN PATENT DOCUMENTS

2119352 A  11/1983  United Kingdom.
2160188    12/1985  United Kingdom .......... 423/DIG. 38
2160188 A  12/1985  United Kingdom.

OTHER PUBLICATIONS

Sheppard et al. May–Jun. 1969 "Chemical Compostion & Physical Properties of Relate Zeolines Offretite & Erionite" *The American Minerologist* vol. 54 pp. 875–886.

Barrer et al 1978 (No month) "Hydrothermal Chemistry of Silicates. Part 22. Hydrated Barium –Sodium Aluminosilicates" *Journal of The Chemical Society* No.6 pp. 598–601.

*Materials Science and Engineering, An Introduction* Callister, 1985 ( No Month) p. 278.

*Primary Examiner*—Mary L. Bell
*Assistant Examiner*—David Sample
*Attorney, Agent, or Firm*—Edward F. Sherer

[57] ABSTRACT

Zeolite crystals having an offretite structure have smaller crystals and/or can be produced using a synthesis mixture of lower alkalinity than could otherwise be used, if a divalent metal cation, such as magnesium, barium or cobalt is included in the synthesis mixture.

18 Claims, 1 Drawing Sheet

(MAGNIFICATION 10,000)
OFFRETITE CRYSTALS CRYSTALLIZED WITH $Mg^{2+}$-SPECIES:

(MAGNIFICATION 10,000)
OFFRETITE CRYSTALS CRYSTALLIZED WITH $Mg^{2+}$-SPECIES:

OFFRETITE CRYSTALS CRYSTALLIZED WITHOUT ADDED $Mg^{2+}$-SPECIES

SILICEOUS OFFRETITE

This is a continuation of application Ser. No. 08/108,554, filed Sep. 30, 1993, now abandoned, which is a continuation of International application Ser. No. PCT/EP92/00370.

BACKGROUND OF THE INVENTION

1. Field of the Invention

The present invention relates to zeolite crystals with an offretite structure, which crystals contain a divalent metal cation and processes for producing such zeolites and a process for using the zeolites in the separation or conversion of hydrocarbons.

2. Description of Related Art

One of the zeolitic structures which occurs naturally is offretite. Naturally occurring offretite is rare, and it is known to produce offretite synthetically. For example, U.S. Pat. No. 4,259,174 describes a synthetic offretite which is a crystalline aluminosilicate comprising tetramethylammonium, sodium and potassium ions. U.S. Pat. No. 4,834,961 and GB2119352 have similar disclosures. Offretite may then be ion exchanged to introduce a metal cation from group II or Group VIII of the periodic table or manganese.

GB-A-2160188 describes the preparation of a synthetic offretite containing potassium ions and at least one ion selected from other alkali or alkaline earth metals. The use of a mixture of potassium and sodium or a mixture of potassium, sodium and lithium ions is preferred. If the zeolite is to be used in acid catalysis then it may be exchanged with cations such as magnesium. When the zeolite is to be used as a carrier of a hydrocarbon conversion catalyst, it is possible to carry out post-production alterations to the zeolite, e.g. to lower its potassium content or to introduce other metal cations into the zeolite using known methods.

SUMMARY OF THE INVENTION

The present applicants have surprisingly found that the incorporation of a divalent metal cation into the synthesis mixture which crystallises to give an offretite is advantageous. The inclusion of the divalent cation speeds the rate of formation of the crystals and results in smaller crystals compared with a mixture which is identical but for the lack of added divalent cation and which is treated under the same conditions of temperature, pressure and time.

Thus the present invention provides a zeolite with an offretite crystal structure and which comprises a non-exchangeable amount of a divalent metal cation.

DETAILED DESCRIPTION OF THE INVENTION

Figure 1A:
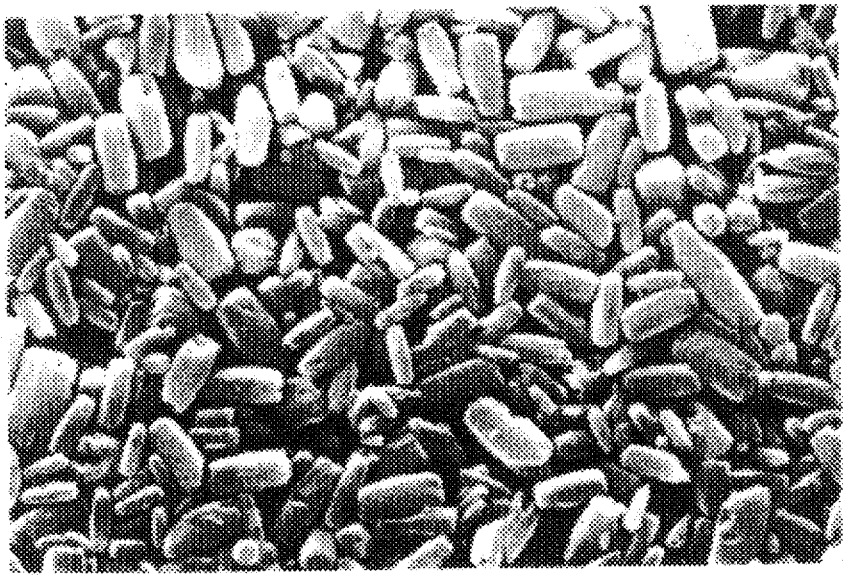
FIG. 1 shows scanning electron micrographs of offretite crystals produced with and without the presence of divalent metal in the synthesis mixture according to Example 1.

Preferably the divalent metal cation is an alkaline earth metal from group IIA of the periodic table, particularly magnesium, barium or cobalt.

The inclusion of a cation such as magnesium makes it possible to use a synthesis mixture which has a lower alkalinity, expressed as a molar ratio of $M'_2O/SiO_2$ (where M' is as defined hereinafter), than could previously be used, and still obtain an offretite crystal structure. A synthesis mixture of low alkalinity may be preferred to produce a zeolite such as offretite since the product will be more siliceous and consequently is more stable when used, e.g. as the basis for a catalyst in a hydrocarbon conversion or separation process.

The offretite crystals of the present invention may be produced using an adaptation of standard procedures to produce zeolite crystals of an offretite structure. Thus the present invention provides a process for producing offretite crystals by crystallising a synthesis mixture comprising sources of $M'_2O$, $Al_2O_3$, $SiO_2$, a tetramethylammonium (TMA) ion and a divalent metal cation $M^{2+}$, where M' is an alkali metal which is potassium or a mixture of potassium and sodium.

The source of alkali metal oxide $M'_2O$, is conveniently introduced into the synthesis mixture in the form of potassium hydroxide and optionally also sodium hydroxide e.g. as pellets.

The source of aluminum may be an alumina introduced into the reaction mixture as for example $Al_2O_3.3H_2O$, previously dissolved in alkali. However, it is also possible to introduce aluminum in the form of the metal which is dissolved in alkali.

The source of $SiO_2$ is generally silica, and this is conveniently provided in the form of a colloidal suspension of silica such as Ludox HS 40 available from E. I. Dupont De Nemours & Co. Colloidal silica sols are preferred since they result in less contaminating phases. However, other sources such as silicates may be used.

The tetramethylammonium ion is conveniently provided in the form of a tetramethylammonium halide, such as the chloride.

The divalent metal cation may be a group Ib metal such as copper, a group II metal, for example magnesium, calcium or barium, a group IV metal such as lead or group VI, VII or VIII metal such as chromium, manganese, iron, cobalt or nickel. These metals may be introduced in the form of any convenient compound, for example as an oxide, hydroxide, nitrate or sulfate. Magnesium, barium and cobalt are particularly preferred cations.

A typical synthesis process will comprise the formation of four solutions:

an aluminate solution containing the source of alkali metal and alumina;

a colloidal silica solution;

a solution of tetramethylammonium halide;

a solution containing the source of divalent cation e.g. $Mg(NO_3)_2.6H_2O$.

The solutions are then mixed in any order to produce the synthesis mixture.

It is preferred that the synthesis mixture comprises the ingredients in the following molar ratios:

| | |
|---|---|
| $M'_2O/SiO_2$ | 0.12 to 0.4 |
| $SiO_2/Al_2O_3$ | 7 to 13 |
| $TMA/SiO_2$ | 0.04 to 0.12 |
| $H_2O/M'_2O$ | 40 to 135. |

Optionally these ratios are:

$M'_2O/SiO_2$ 0.15 to 0.4, preferably 0.18 to 0.36, more preferably about 0.2 to 0.28, e.g. about 0.23;

$SiO_2/Al_2O_3$ 8 to 12, preferably 9 to 11, e.g. about 10;

$TMA/SiO_2$ preferably 0.06 to 0.11, e.g. about 0.1; and $H_2O/M'_2O$ 40 to 100, preferably 60 to 80, e.g. about 70.

Suitable quantities of divalent depend on the particular cation used. The following quantities are given for guidance. If the cation is magnesium or cobalt then as little as 15 ppm will suffice to produce the advantageous effects on crystal size and formation rate. For example, amounts of 15 to 150 ppm, preferably 30 to 90 ppm, of magnesium or cobalt are suitable. These quantities are based on the weight of the synthesis mixture.

On the other hand, if barium is used, then larger amounts of cation may be necessary to produce the advantageous effects. For example, 250 to 900 ppm, preferably 300 to 450 ppm of barium may be used.

The synthesis mixture is crystallised to produce the zeolite. Crystallisation is generally carried out in a sealed autoclave and thus at autogenous pressure. It is possible to employ higher pressures resulting from higher temperature. Lower pressure (which corresponds to lower temperatures) will require longer crystallisation times.

Crystallisation time is related to the crystallisation temperature. In general, the higher the crystallisation temperature, the faster the crystallisation. The crystallisation is usually carried out at a temperature of at least 120° C., preferably in the region of 120° to 180° C., more preferably in the region of 150° C. At this temperature the crystallisation time may be from 50 to 250 hours, typically from 40 to 80 hours.

Following this preparation the zeolite may be separated, washed and dried. The washing may be to a pH of more than 7, e.g. 9 to 10. Drying may be at a temperature of from at least 100° C. e.g. about 150° C. for about 16 hours.

Scanning electron micrographs (SEM) of the products show that they consist of crystals which are approximately cylindrical or barrel-like in shape with a hexagonal cross-section. X-ray diffraction showed that the products are excellently crystalline and pure zeolite offretite.

The X-ray diffractograph showed no extra peaks at 2θ values of 9.63, 16.55 or 21.35, indicating that the crystals are free from stacking faults.

Figure 1B:
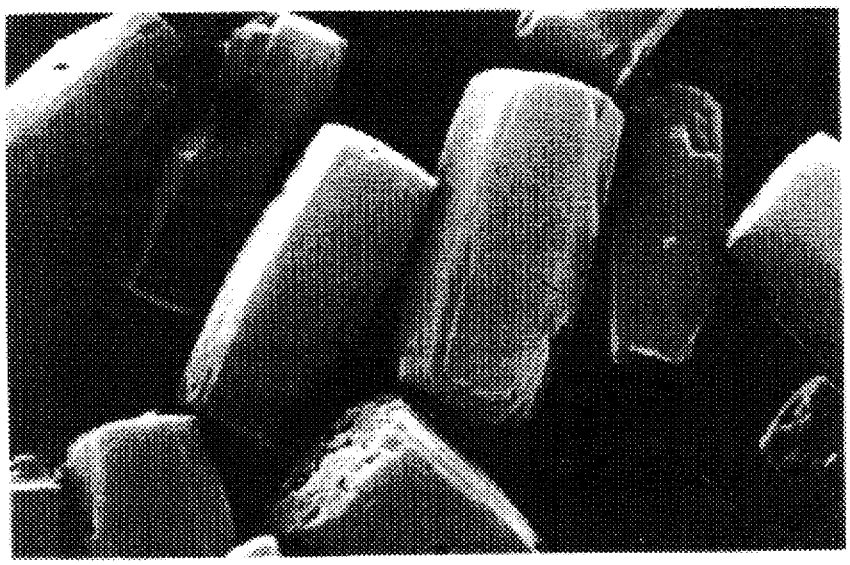

FIG. 1 shows SEM's of offretite crystals produced with and without the presence of Mg in the synthesis mixture.

The zeolites of the present invention are preferably aluminosilicates and are described herein in terms of aluminosilicates, but the substitution of other elements is possible; for example, aluminium may be substituted by gallium. However, the advantageous effect of the added divalent cation decreases with increasing substitution of gallium. It is therefore preferred that the zeolite is an aluminosilicate.

The zeolite may be used as a selective adsorbent in a hydrocarbon separation or conversion process e.g. in catalytic de-waxing of hydrocarbons or in a hydrocracking or a hydroisomerisation process. The ability to prepare crystals in accordance with the present invention which are smaller than crystals produced without the addition of a divalent cation is beneficial since the smaller crystals will exhibit a reduced mass transfer resistance. The operating temperature in the separation process could therefore be reduced. Looked at from another point of view, the addition of a divalent cation to a synthesis mixture enables one to use a more highly siliceous synthesis mixture (which produces a more stable product) and still obtain a small crystal size in the product.

The zeolite may be composited with a binder and/or used in intimate combination with one or more catalytically-active metals. Suitable binders include e.g. silica, alumina, or a clay such as kaolin.

The catalytically-active metal may be for example tin, germanium, tungsten, vanadium, molybdenum, chromium, manganese or a group VIII metal such as platinum, palladium, cobalt, nickel or a mixture of e.g. platinum and rhenium.

The metal may be combined with the zeolite by e.g. ion-exchange, impregnation or intimately mixing the metal (s) and the zeolite.

Accordingly, the present invention provides a process for separating or converting hydrocarbons comprising the use as a catalyst of a zeolite as described herein.

The present invention is illustrated by the following examples:

EXAMPLE 1

Preparation of small-crystal-size zeolite offretite by using traces of $Mg^{2+}$-species in the synthesis mixture.
Preparation of Synthesis Mixture
(All quantities of chemicals are given in grams)

| Solution A: Aluminate Solution | |
|---|---|
| KOH pellets (87.3% purity) | 29.59 |
| Al(OH)$_3$ powder (98.6% purity) | 15.80 |
| H$_2$O | 65.91 |
| Solution B: Colloidal Silica | |
| Ludox HS-40 | 150.23 |
| Solution C: Tetramethylammonium chloride | |
| TMA-Cl | 11.01 |
| H$_2$O | 75.39 |
| Solution D: Magnesium Nitrate | |
| Mg(NO$_3$)$_2$.6 H$_2$O | 0.1277 |
| H$_2$O | 49.29 |

These 4 solutions were combined as follows:
Solution C was added to solution B and mixed to homogenize, solution D was added to the combined solutions C/B, and finally solution A was added to the combined solutions C/B/D. The whole was mixed for about 4 minutes to ensure a homogeneous mixture.

The thus obtained mixture had a molar composition of:
2.30 K$_2$O/Al$_2$O$_3$/9.96 SiO$_2$/1.0 TMACl/161 H$_2$O+30 wt ppm Mg based on the weight of synthesis mixture.
Crystallization:
300.83 gram of the mixture was transferred into a carefully cleaned 300 ml stainless steel autoclave and heated up to 150° C., the total heating time was 69 hours.
Washing and Recovery of the Product:
The product was washed with demineralized water to pH 10.5 and subsequently dried at 125° C. during about 16 hours. The quantity of product recovered was: 55.8 grams.

COMPARATIVE EXAMPLE A

Preparation of zeolite offretite without addition of $Mg^{2+}$-species in the synthesis mixture.

A similar synthesis mixture was prepared using the same ingredients as in Example 1 with the exception of the $Mg^{2+}$-species. The molar composition of this mixture was:
2.30 K$_2$O/Al$_2$O$_3$/9.96 SiO$_2$/1.0 TMACl/162 H$_2$O.
Crystallization:
299.85 grams of the mixture was crystallized under the same conditions as in Example 1.
Washing and Recovery of the Product:
The product was washed to pH 10.4 and dried during about 16 hours at 125° C. The quantity of recovered product was: 54.8 grams.

Characterization:

X-ray diffraction showed that both products were excellently crystalline and pure zeolite offretite. This indicates that, under the above synthesis conditions, the presence of $Mg^{2+}$-species in the crystallizing magma does not trigger formation of by products such as zeolite-L, Philipssite etc.

SEM showed that the offretite crystals prepared with $Mg^{2+}$-species were about 4 times smaller than those obtained without $Mg^{2+}$ species. Comparative 10000 times micrographs are shown in FIG. 1.

EXAMPLE 2

Synthesis details:

A similar synthesis was carried out using the same ingredients as in Example 1 and comparative example a. The synthesis mixture had the following molar composition:

1.8 $K_2O/1.0$ $TMACl/Al_2O_3/10SiO_2/160H_2O+X$ ppm $Mg^{2+}$ the mixture was crystallised for 70 hours at 150° C. in a 300 ml stainless steel autoclave.

Details of the products are given in Table 1.

2.3 $K_2O/1.0$ $TMACl/Al_2O_3/10$ $SiO_2/160H_2O+30$ or 90 ppm $Mg^{2+}$.

The mixture was crystallised at 150° C. for 70 hours in a 300 ml stainless steel autoclave.

The mixture containing 30 ppm magnesium produced hexagonal barrel shaped crystals of length 0.5 to 1.5 microns. The synthesis mixture containing 90 ppm of magnesium produced hexagonal barrel shaped crystals of length 0.5 to 1.2 microns. Thus an increase in the amount of magnesium used in the synthesis gel does not further reduce significantly the size of offretite crystals.

EXAMPLE 4

The beneficial effect of adding magnesium can also be seen when the potassium in the synthesis mixture is partly replaced by sodium.

A synthesis mixture was prepared using the ingredients of example 1, but in which potassium hydroxide was partly replaced by sodium hydroxide. Synthesis gels were produced having the following molar compositions:

TABLE 1

| | SYNTHESIS | | | PRODUCT | | | | |
|---|---|---|---|---|---|---|---|---|
| | | wt ppm $Mg^{2+}$ | | XRD | | SEM Crystallite | | |
| | $K_2O/SiO_2$ Ratio | in gel (X) | heating time (hrs) | % cryst. vs Ref. | contaminants | habit | length (microns) | dia (microns) |
| Ref. Ex.b. | 0.18 | nil | 70 | 78 | amorphous | hexagonal barrels | 4–10 | 2.5 |
| Ex. 2 | 0.18 | 30 | 70 | 94 | none | hexagonal barrels | 1–3 | 0.5–1 |

In the absence of magnesium, the product is 78% crystalline and contains amorphous contaminants. Using magnesium permits the production of a more crystalline product (94% crystalline) without contamination indicating that the cation enhances the rate of formation of crystalline product i.e. the cation is a crystallisation promoter. Moreover, the crystals are smaller.

EXAMPLE 3

Example 1 was repeated using 30 and 90 ppm of magnesium respectively. Thus the synthesis gel had the following molar compositions.

1.15 $Na_2O/1.15$ $K_2O/1.0$ $TMACl/Al_2O_3/10$ $SiO_2/161$ $H_2O$ (+30 ppm $Mg^{2+}$).

The mixture was crystallised at 150° C. for 68 hours in a 300 ml stainless steel autoclave. Reference Examples were prepared in which no $Mg^{2+}$ was added to the synthesis mixture. Reference Example C used only KOH in preparing the mixture; Reference Example D used a mixture of KOH and NaOH. The results are given in Table 2.

TABLE 2

| | | PRODUCT | | | | | Prod yield |
|---|---|---|---|---|---|---|---|
| | | XRD | | SEM | | | |
| | Synthesis Mixture | % Cryst Ref. | contaminants | habit | length (microns) | diameter (microns) | wt % a) |
| Ref C | K only no $Mg^{2+}$ added | 100 | none | hexagonal barrel | 3–5 | 2 | 16.4 |
| Ref D | K/Na present no $Mg^{2+}$ added | 90 | none | sphere-like | — | ~5 | >16.0 (some product losses during washing). |

TABLE 2-continued

| | | PRODUCT | | | | | Prod |
|---|---|---|---|---|---|---|---|
| | | XRD | | | SEM | | yield |
| | Synthesis Mixture | % Cryst Ref. | contaminants | habit | length (microns) | diameter (microns) | wt % a) |
| Ex. 4 | K/Na present 30 ppm $Mg^{2+}$ added | 93 | none | sphere-like | — | 1–3 | 16.4 | a) at calcined product/wt gel *100%

EXAMPLES 5 to 8

The $K_2O/SiO_2$ ratio in the synthesis gel was further reduced compared with Example 1.

Using the ingredients of example 1, synthesis gels were produced having the following composition:

without magnesium: (1.8–2.3)$K_2O$/1.0 $TMACl/Al_2O_3$/10 $SiO_2$/160 $H_2O$.

with magnesium: (1.5–2.0)$K_2O$/1.0 $TMACl/Al_2O_3$/(10–12.5) $SiO_2$/160 $H_2O$+30 ppm $Mg^{2+}$.

The synthesis mixtures were crystallised at 150° C. in a 300 ml stainless steel autoclave for the times shown in Table 3.

Reference Examples C, E and F were prepared in which magnesium was not added to the synthesis mixtures, and in which the synthesis mixtures had ratios of $K_2O/SiO_2$ which varied from 0.18 to 0.23. Examples 5 to 8 were produced from synthesis mixtures whose $K_2O/SiO_2$ ratios varied from 0.144 to 0.20 and to each of which mixture had been added 30 ppm of $Mg^{2+}$.

Details of the ratio of ingredients and properties of the products produced are given in Table 3.

The $SiO_2/Al_2O_3$ ratio in the product was calculated. This is based on the assumption that all the aluminium in the autoclave is in the product. Previous analyses have shown this to be a reasonable assumption. Knowing the quantities of other materials present and assuming that the weight of potassium in the product accounts for the total weight contributed by the potassium and TMA it is possible to calculate the $SiO_2/Al_2O_3$ molar ratio. Because of the assumptions the calculation is a conservative estimate of the ratio, and analysis shows that the product is in fact, slightly more siliceous than the calculated ratios indicates.

In the absence of $Mg^{2+}$ calculated molar $SiO_2/Al_2O_3$ ratios of 8.5 may be achieved. When $Mg^{2+}$ is added to the synthesis mixture this ratio may be increased to as much as 9.9.

It can be seen from this that the inclusion of magnesium enables the production of offretite containing larger proportions of silica than would otherwise be possible for a particular crystal size.

TABLE 3

| | SYNTHESIS | | XRD | | PRODUCT | | | | |
|---|---|---|---|---|---|---|---|---|---|
| | | | | | SEM Crystallite | | | product yield | $SiO_2/Al_2O_3$ Ratio |
| | $K_2O/SiO_2$ Ratio | Heating time (hrs) | % cryst vs ref. | contaminants | habit | length (microns) | diameter (microns) | wt % a) | calculated from Product Yield | analyzed |
| Ref. C | 0.23 | 70 | 100 | none | hexagonal barrels | 3–5 | 2 | 16.4 | >7.5 | 8.5 |
| Ref. E | 0.20 | 70 | 94 | none | hexagonal barrels | 3–8 | 2.4 | >16.9 | >8.0 | N/A |
| Ref. F | 0.18 | 70 (spot) (b) 96 | 78 87 | amorph. none | hexagonal barrels | 4–10 | 2.5 | >17.5 | >8.5 | N/A |

| | SYNTHESIS | | | XRD | | PRODUCT | | | | |
|---|---|---|---|---|---|---|---|---|---|---|
| | | | | | | SEM Crystallite | | | product yield | $SiO_2/Al_2O_3$ ratio calc |
| | $K_2O/SiO_2$ Ratio | $SiO_2/Al_2O_3$ Ratio | Heating time (hrs) | % cryst vs ref. | contaminants | habit | length (microns) | diameter (microns) | wt % a) | from Prod. Yield |
| Ex 5 | 0.20 | 10 | 70 | 101 | none | hexa-gonal bar-rels | 1–1.5 | 0.5–0.8 | 17.4 | >8.2 |
| Ex 6 | 0.18 | 10 | 70 | 94 | none | | 1–2.5 | 0.5–1.0 | 18.0 | >8.4 |
| Ex 7 | 0.15 | 10 | 120 (spot) 230 (final) | 91 101 | amorphous none | | 2–5 | 1–2 | 18.5 | >8.7 |
| Ex 8 | 0.144 | 12.5 | 120 (spot) 230 (final) | 72 98 | amorphous none | | 2–6 | 1–2 | 19.6 | >9.9 | a) wt calcined product/wt gel *100%
b) The autoclave was cooled down to freeze the system, a spot sample was taken and the autoclave with then heated up, to continue the crystallisation process.

EXAMPLES 9 to 10

The use of barium cations was compared with the use of magnesium ions. Using the same ingredients as in example 1, synthesis mixtures were produced having the following molar compositions:

1.50 $K_2O$/1.0 TMACl/$Al_2O_3$/10 $SiO_2$/160 $H_2O$+X ppm $Mg^{2+}$/$Ba^{2+}$

The mixture was crystallised at 150° C. in a 300 ml stainless steel autoclave for the length of time indicated in Table 4.

The properties of the products are also indicated in Table 4. The results for Example 7, using a smaller amount of $Mg^{2+}$ then Example 9 are included in Table 4 for comparison.

EXAMPLE 12

The effect of reduction of the $K_2O$/$SiO_2$ ratio in the synthesis gel was further examined in a synthesis gel using barium cations.

The same ingredients as in Example 1 were used, save for the use of hydrated barium hydroxide, $Ba(OH)_2 \cdot 8H_2O$ in place of magnesium nitrate, and by the same procedure a synthesis gel was produced having the following composition:

1.3$K_2O$/1.0TMACl/$Al_2O_3$/10$SiO_2$/160$H_2O$+714 wt ppm $Ba^{2+}$. The synthesis gel was crystallised generally as described in Example 1 but held at 150° C. for 10 hours. The product was washed to pH 10.1 and dried at 150° C. for 10 hours.

A comparative synthesis gel was prepared in the same way but in which the $K_2O$/$SiO_2$ ratio was further reduced to

TABLE 4

| | SYNTHESIS | | | PRODUCT - OFFRETITF | | | | |
|---|---|---|---|---|---|---|---|---|
| | | time into | | XRD | SEM Crystallite | | Product Yield | $SiO_2$/$Al_2O_3$ |
| | divalent cation | heating | % cryst | contami- | length | dia | wt % | Ratio |
| | type  conc. ppm | hrs | vs ref | nants | habit | (microns) | a) | (calc) |
| Ex 7 | $Mg^{2+}$  30 | 120 (spot) 230 (final) | 91 101 | amorphous none | | 2–5 | 1–2 | 18.5 | >8.7 |
| Ex 9 | $Mg^{2+}$  62 | 120 (spot) | 97 | trace of amorphous | | 2–5 | 1–2 | | |
| Ex 10 | $Ba^{2+}$  355 | 93 | 96 | none | | 1–2 | 0.5–1 | 18.4 | >8.6 | a) wt calcined product/wt gel *100%.

EXAMPLE 11

The addition of cobalt is shown to have a beneficial effect. Synthesis mixtures were prepared using the same ingredients and methods as in Example 1, but cobalt nitrate was substituted for the magnesium source. The synthesis mixture of Example 11 had the following molar composition:

2.85 $K_2O$/$Al_2O_3$/TMACl/10 $SiO_2$/160 $H_2O$+30 ppm $Co^{2+}$.

The amount of $Co^{2+}$ is based on the total weight of the synthesis mixture. A comparative synthesis mixture (Reference Example G) was prepared in the same way and having the same molar composition but without the added cobalt.

The synthesis mixtures were each placed in a 300 ml stainless steel autoclave, heated to 150° C. and maintained at that temperature for 70 hours.

The products were each washed to a pH of 10.4 and dried.

X-ray diffraction showed that both products were offretite with excellent crystallinity and had no amorphous contaminants. The crystal sizes of the products, assessed using SEM, are given in Table 5.

| | xtal Length (µm) | ave. Length (µm) |
|---|---|---|
| Example 11 | 0.3–0.9 | 0.6 |
| Ref. Ex. G | 1.5–4 | 3 |

The crystals of Example 11 had a significantly smaller length and were congruently reduced in size compared with the crystals of Reference Example G.

0.11. Crystallisation was carried out over an extended period and samples taken at 119 and 283 hours when crystallisation was stopped.

X-ray diffraction showed that Example 12 gave offretite of excellent crystallinity and purity. SEM showed the offretite crystals to be barrel-shaped with a length of about 1.0 micron and a diameter of about 0.6 micron.

Reference Example H gave only amorphous material after 119 hours heating at 150° C. After a total of 283 hours crystallisation X-ray diffraction showed only traces of offretite, the product being mainly zeolite W.

I claim:

1. A process for producing a zeolite with an offretite crystal structure and which contains a non-exchangeable amount of divalent metal cation, which process comprises crystallizing a synthesis mixture comprising sources of $M'_2O$, where M' is an alkali metal which is potassium or a mixture of potassium and sodium, $Al_2O_3$, $SiO_2$, a tetramethylammonium ion and a divalent metal cation $M^{2+}$, and comprising the following molar ratios:

| $M'_2O$/$SiO_2$ | 0.12 to 0.4 |
|---|---|
| $SiO_2$/$Al_2O_3$ | 7 to 13 |
| TMA/$SiO_2$ | 0.04 to 0.12 |
| $H_2O$/$M'_2O$ | 40 to 135, | wherein TMA represents said tetramethylammonium ion, said synthesis mixture containing said divalent metal cation at a level sufficient to promote the formation of smaller zeolite crystals than an otherwise identical synthesis mixture which does not contain said added divalent metal cation, said level not exceeding 900 ppm, when the divalent cation is barium.

2. A process as claimed in claim 1 in which M is magnesium, and the synthesis mixture contains 15 to 150 ppm of $Mg^{2+}$.

3. A process as claimed in claim 1 in which M is barium, and the synthesis mixture contains 250 to 900 ppm of $Ba^{2+}$.

4. A process as claimed in claim 1 in which M is cobalt, and the synthesis mixture contains 15 to 150 ppm of $Co^{2+}$.

5. A process as claim in claim 1 in which the crystallisation is carried out at 120° to 180° C. for 50 to 250 hours.

6. The process of claim 1 wherein said divalent metal cation is selected from the group consisting of copper, magnesium, calcium, barium, lead, chromium, manganese, iron, cobalt and nickel.

7. A synthetic zeolite with an offretite crystal structure which contains a non-exchangeable amount of a divalent metal cation, said zeolite crystallized from a synthesis mixture comprising sources of $M'_2O$ where M' is an alkali metal which is potassium or a mixture of potassium and sodium, and also containing said divalent metal cation at a level sufficient to promote the formation of smaller zeolite crystals than an otherwise identical synthesis mixture which does not contain said added divalent metal cation, said level not exceeding 900 ppm, when the divalent cation is barium.

8. The synthetic zeolite of claim 7 wherein said divalent metal cation is selected from the group consisting of copper, magnesium, calcium, barium, lead, chromium, manganese, iron, cobalt and nickel.

9. The synthetic zeolite of claim 8 which is crystallized from a synthesis mixture containing magnesium or cobalt cations at a maximum level of 150 ppm.

10. The synthetic zeolite of claim 9 which is crystallized from a synthesis mixture containing magnesium or cobalt cations at a level of from about 30–90 ppm.

11. The synthetic zeolite of claim 9 wherein said cation is magnesium.

12. The synthetic zeolite of claim 9 wherein said cation is cobalt.

13. The synthetic zeolite of claim 7 which is crystallized from a synthesis mixture containing $SiO_2$ and $Al_2O_3$ at a respective molar ratio of 7 to 13:1.

14. The synthetic zeolite of claim 8 which is crystallized from a synthesis mixture containing barium cation.

15. The synthetic zeolite of claim 14 which is crystallized from a synthesis mixture containing 250 to 900 ppm barium.

16. The synthetic zeolite of claim 15 wherein said synthesis mixture contains 300 to 450 ppm barium.

17. The synthetic zeolite of claim 14 which is crystallized from a synthesis mixture containing $SiO_2$ and $Al_2O_3$ at a respective molar ratio of 7 to 13:1.

18. A catalyst comprising a zeolite as claimed in claim 7 and a catalytically active metal.

* * * * *